(12) United States Patent
Nishimura et al.

(10) Patent No.: US 11,207,814 B2
(45) Date of Patent: Dec. 28, 2021

(54) METHOD OF MANUFACTURING AN ESCALATOR HANDRAIL

(71) Applicant: Mitsubishi Electric Corporation, Tokyo (JP)

(72) Inventors: Yoshitomo Nishimura, Tokyo (JP); Tomoko Hada, Tokyo (JP); Hidetoshi Takeyama, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/506,318

(22) Filed: Jul. 9, 2019

(65) Prior Publication Data

US 2019/0329475 A1    Oct. 31, 2019

Related U.S. Application Data

(62) Division of application No. 14/912,305, filed as application No. PCT/JP2014/074810 on Sep. 19, 2014, now Pat. No. 10,399,265.

(30) Foreign Application Priority Data

Sep. 26, 2013    (JP) ................................ 2013-199496

(51) Int. Cl.
*B29C 48/15*    (2019.01)
*B29C 48/12*    (2019.01)
(Continued)

(52) U.S. Cl.
CPC .............. *B29C 48/12* (2019.02); *B29C 48/07* (2019.02); *B29C 48/15* (2019.02); *B29C 48/156* (2019.02);
(Continued)

(58) Field of Classification Search
None
See application file for complete search history.

(56) References Cited

U.S. PATENT DOCUMENTS 2,479,919 A    8/1949    Flood
2,810,424 A    10/1957    Swartswelter et al.
(Continued)

FOREIGN PATENT DOCUMENTS

CA    898726 A    4/1972
CA    936569 A1    11/1973
(Continued)

OTHER PUBLICATIONS

Office Action dated Nov. 12, 2019, by the Chinese Patent Office in corresponding Chinese Patent Application No. 201710783411.6 and English translation of the Office Action. (13 pages).
(Continued)

*Primary Examiner* — Edmund H Lee
(74) *Attorney, Agent, or Firm* — Buchanan Ingersoll & Rooney PC

(57) ABSTRACT

A method of manufacturing an escalator handrail which has a composite material including a metallic steel wire and a thermoplastic resin, said metallic steel wire having a center elemental wire and a plurality of strands placed so as to surround the center elemental wire, including: a preheating step of heating the metallic steel wire; a composite-material forming step of integrating the metallic steel wire heated in the preheating step with the thermoplastic resin in a molten state to thereby form the composite material; and a cooling step of cooling the composite material formed in the composite-material forming step.

7 Claims, 3 Drawing Sheets

(51) Int. Cl.
*B66B 23/24* (2006.01)
*B29C 48/07* (2019.01)
*D07B 1/06* (2006.01)
*D07B 1/16* (2006.01)
*B29C 48/156* (2019.01)
*B29K 101/12* (2006.01)
*B29K 305/12* (2006.01)
*B29L 31/00* (2006.01)
*B29C 48/88* (2019.01)

(52) U.S. Cl.
CPC ............ *B66B 23/24* (2013.01); *D07B 1/0613* (2013.01); *D07B 1/16* (2013.01); *B29C 48/919* (2019.02); *B29K 2101/12* (2013.01); *B29K 2305/12* (2013.01); *B29L 2031/7092* (2013.01); *D07B 2201/1092* (2013.01); *D07B 2201/2073* (2013.01); *D07B 2201/2074* (2013.01); *D07B 2201/2081* (2013.01); *D07B 2207/4059* (2013.01); *D07B 2301/258* (2013.01); *D07B 2401/208* (2013.01); *D07B 2501/2076* (2013.01)

(56) References Cited

U.S. PATENT DOCUMENTS

| | | | |
|---|---|---|---|
| 3,212,627 | A | 10/1965 | Harry |
| 3,616,496 | A | 11/1971 | Anglioletti et al. |
| 3,949,858 | A | 4/1976 | Ballocci et al. |
| 4,087,223 | A | 5/1978 | Angioletti et al. |
| 4,274,821 | A | 6/1981 | Kiemer |
| 4,300,379 | A | 11/1981 | Johnson et al. |
| 4,453,910 | A * | 6/1984 | Ball ................ B29C 65/18 425/12 |
| 4,484,963 | A | 11/1984 | Anctil et al. |
| 4,934,100 | A | 6/1990 | Adell |
| 4,952,262 | A | 8/1990 | Washkewicz et al. |
| 5,048,280 | A | 9/1991 | Okamoto et al. |
| 5,096,645 | A | 3/1992 | Fink |
| 5,255,772 | A | 10/1993 | Ball et al. |
| 7,600,366 | B2 | 10/2009 | Furukawa et al. |
| 7,951,254 | B2 | 5/2011 | Ball et al. |
| 8,061,215 | B2 | 11/2011 | Caunce et al. |
| 8,206,528 | B2 | 6/2012 | Qureshi |
| 8,323,544 | B2 * | 12/2012 | Haider ............. B29C 48/865 264/171.13 |
| 8,337,977 | B2 | 12/2012 | Qureshi |
| 8,721,949 | B2 * | 5/2014 | Wesson ............ B66B 23/24 264/279 |
| 9,579,839 | B2 * | 2/2017 | Kenny ............. B29C 48/05 |
| 9,981,415 | B2 * | 5/2018 | Kenny ............. B29C 48/06 |
| 10,940,625 | B2 * | 3/2021 | Kenny ............. B29C 48/908 |
| 2003/0106300 | A1 * | 6/2003 | Bruyneel ............ F16G 1/12 57/212 |
| 2004/0247843 | A1 | 12/2004 | McLeod et al. |
| 2005/0147702 | A1 | 7/2005 | Higashi |
| 2005/0173224 | A1 | 8/2005 | Caunce |
| 2007/0102183 | A1 | 5/2007 | Jotti et al. |
| 2007/0125301 | A1 | 6/2007 | Zhou et al. |
| 2008/0236130 | A1 | 10/2008 | Furukawa et al. |
| 2008/0271974 | A1 | 11/2008 | El-Wardany et al. |
| 2009/0120575 | A1 | 5/2009 | Qureshi |
| 2009/0163663 | A1 | 6/2009 | Qureshi |
| 2010/0051174 | A1 * | 3/2010 | Murata ............. B29C 66/91651 156/91 |
| 2010/0237535 | A1 * | 9/2010 | Haider ............. B29C 48/154 264/234 |
| 2010/0258403 | A1 | 10/2010 | Haider et al. |
| 2010/0283173 | A1 * | 11/2010 | Kenny ............. B29C 48/919 264/101 |
| 2012/0321734 | A1 | 12/2012 | Kenny et al. |
| 2015/0283750 | A1 | 10/2015 | Kenny et al. |

FOREIGN PATENT DOCUMENTS

| | | |
|---|---|---|
| CA | 1048301 A1 | 2/1979 |
| CA | 1163879 A | 3/1984 |
| CA | 1261583 A | 9/1989 |
| CA | 2343037 A1 | 3/2000 |
| CA | 2482620 A1 | 3/2005 |
| CN | 1427911 A | 7/2003 |
| CN | 101855059 A | 10/2010 |
| DE | 6916579 U | 10/1969 |
| DE | 3836788 C1 | 8/1989 |
| DE | 69314144 T2 | 4/1998 |
| EP | 0134545 A1 | 3/1985 |
| EP | 0273479 A1 | 7/1988 |
| EP | 1426482 A1 | 6/2004 |
| EP | 2159184 B1 | 8/2014 |
| FR | 1244910 A | 11/1960 |
| GB | 1355039 A | 6/1974 |
| GB | 2243163 A | 10/1991 |
| JP | 5110585 A | 1/1976 |
| JP | 56169886 A | 12/1981 |
| JP | 59057464 U | 4/1984 |
| JP | 59102324 U | 7/1984 |
| JP | 6310266 Y2 | 3/1988 |
| JP | 63046196 B2 | 9/1988 |
| JP | 02074689 A | 3/1990 |
| JP | 06071780 A | 3/1994 |
| JP | 07033376 A | 2/1995 |
| JP | 07047583 A | 2/1995 |
| JP | 2000071353 A | 3/2000 |
| JP | 2002327381 A | 11/2002 |
| JP | 2003327380 A | 11/2003 |
| JP | 2005193494 A | 7/2005 |
| JP | 2006076069 A | 3/2006 |
| JP | 2007084979 A | 4/2007 |
| JP | 2007514873 A | 6/2007 |
| JP | 2007246176 A | 9/2007 |
| JP | 4096879 B2 | 6/2008 |
| JP | 2008248426 A | 10/2008 |
| JP | 2010265086 A | 11/2010 |
| JP | 2010538932 A | 12/2010 |
| JP | 2010538933 A | 12/2010 |
| JP | 2012011718 A | 1/2012 |
| JP | 2014156323 * | 8/2014 |
| JP | 5675357 B2 | 2/2015 |
| JP | 5770473 B2 | 8/2015 |
| JP | 2015212091 A | 11/2015 |
| JP | 2017141084 A | 8/2017 |
| KR | 20070024463 A | 3/2007 |
| KR | 10-2010-0072017 A | 6/2010 |
| KR | 20100063791 A | 6/2010 |
| WO | 0001607 A1 | 1/2000 |
| WO | 0156914 A1 | 8/2001 |
| WO | 03025278 A1 | 3/2003 |
| WO | 2004055263 A1 | 7/2004 |
| WO | 2005028231 A1 | 3/2005 |
| WO | 2006110136 A1 | 10/2006 |
| WO | 2007075162 A1 | 7/2007 |
| WO | 2007123534 A1 | 11/2007 |
| WO | 2009033270 A1 | 3/2009 |
| WO | 2009033272 A1 | 3/2009 |
| WO | 2009033273 A1 | 3/2009 |
| WO | 2009059416 A1 | 5/2009 |
| WO | 2009059426 A1 | 5/2009 |
| WO | 2009076768 A1 | 6/2009 |
| WO | 2011104887 A1 | 9/2011 |

OTHER PUBLICATIONS

Office Action dated Oct. 1, 2019, by the Korean Patent Office in corresponding Korean Patent Application No. 10-2018-7026793 and English translation of the Office Action. (9 pages).

Estane(R) 58277 TPU, Lubrizol Engineered Polymers Catalogue, issue dale Mar. 2014. (2 pages).

Office Action (Notification of Reason for Refusal) dated Sep. 27, 2017, by the Korean Patent Office in corresponding Korean Patent Application No. 10-2016-7007711, and an English Translation of the Office Action. (7 pages).

(56) References Cited

OTHER PUBLICATIONS

Chinese Office Action dated Oct. 31, 2016 issued in corresponding Chinese Patent Appln. No. 201480051163.0, with English translation (13 pages).
Notification dated Apr. 28, 2017, by the Japanese Patent Office in corresponding Japanese Patent Application No. J016-204046 and English translation of the Office Action. (11 pages).
Office Action {Notification of Reasons for Refusal} dated Jul. 11, 2017, by the Japanese Patent Office in corresponding Japanese Patent Application No. 2016-204046, and an English Translation of the Office Action. (16 pages).
Opposition dated Jul. 28, 2017 in corresponding Japanese Patent No. 6029766, and English translation of the Opposition. (97 pages).
Office Action {Notification of Reasons for Refusal) dated Oct. 30, 2018, by the Japanese Patent Office in corresponding Japanese Patent Application No. 2018-008546 and English translation of the Office Action. (7 pages).
Office Action (Notification of Reason for Refusal) dated Nov. 20, 2018, by the Korean Patent Office in corresponding Korean Patent Application No. 10-2018-7026793 and English translation of the Office Action. (14 pages).
Office Action (Notice of Final Rejection) dated Apr. 30, 2018, by the Korean Patent Office in corresponding Korean Patent Application No. 10-2016-7007711, and a machine English translation thereof.
International Search Report (PCT/ISA/210) dated Dec. 22, 2014, by the Japanese Patent Office as the International Searching Authority for International Application No. PCT/JP2014/074810.
Written Opinion (PCT/ISA/237) dated Dec. 22, 2014, by the Japanese Patent Office as the International Searching Authority for International Application No. PCT/JP2014/074810.
Office Action dated Jun. 12, 2019, in corresponding Chinese Patent Application No. 201710783411.6, and an English translation.
Office Action (Notification of Reason for Refusal) dated Feb. 24, 2020, by the Korean Patent Office in corresponding Korean Patent Application No. 10-2019-7035928 and English translation of the Office Action. (10 pages).
Office Action dated Feb. 5, 2021, by the German Patent Office in corresponding German Patent Application No. 112014004423.7 and English translation of the Office Action. (6 pages).
Office Action dated Feb. 22, 2018, by the German Patent Office in corresponding German Patent Application No. 112014004423.7 and English translation of the Office Action. (8 pages).
Office Action dated Jul. 26, 2019, issued in corresponding Korean Patent Application No. 10-2018-7026793, 7 pages including 3 pages of English translation.

* cited by examiner

US 11,207,814 B2

METHOD OF MANUFACTURING AN ESCALATOR HANDRAIL

TECHNICAL FIELD

The present invention relates to a handrail for escalator which comprises a composite material, and a manufacturing method of the same.

BACKGROUND ART

Escalator handrails used for escalators comprise composite materials each including a metallic steel wire, a thermoplastic resin, a canvas, etc., and are profile shape products each comprising the composite material in which the metallic steel wire is placed in the thermoplastic resin. In Patent Document 1, there is described a manufacturing method of a tire which comprises a resin-metal composite material comprising a resin material and a metallic steel wire. According to the resin-metal composite material in Patent Document 1, the adhesive strength therein has been enhanced using a treatment liquid (special treatment liquid) that contains a silane coupling agent and has a contact angle of 80° or less. The manufacturing method of the resin-metal composite material in Patent Document 1 comprises: applying a solution of the silane coupling agent, that has been prepared by diluting it with water including an alcohol or a surfactant, onto the metallic steel wire followed by sintering at 110° C.; and then subjecting the wire to integral molding by incorporating it into the resin; so that a pull-out strength of the metallic steel wire relative to the resin is intended to be enhanced.

Further, the tire in Patent Document 1 is described: to use a cord of metallic steel wire formed of a mono-filament (single wire) of a metal fiber or a multi-filament (strand wire) provided by twisting such metal fibers; and to be provided as a superior one in adhesion property between the resin material and the metallic steel wire, because of the use of the special treatment liquid, even when the multi-filament is applied as the metallic steel wire.

CITATION LIST

Patent Document

Patent Document 1: Japanese Patent Application Laid-open No. 2012-11718 (Paragraph 0018 to Paragraph 0020, Paragraph 0063, Paragraph 0074, FIG. 1)

SUMMARY OF THE INVENTION

Problems to be Solved by the Invention

Although the metal-fiber single wire or strand wire is used in the tire in Patent Document 1, with respect to the escalator handrail, in order to enhance its strength, there are cases where a metallic steel wire configured with a center elemental wire and a plurality of strands is used. In the case where the metallic steel wire for forming the composite material is configured with the center elemental wire and the plurality of strands, and the center elemental wire and the plurality of strands are twisted together to provide a strand wire as in Patent Document 1, a problem arises in that the thermoplastic resin can not be uniformly filled in between the center elemental wire and the strands, resulting in a large variation in pull-out strength of the metallic steel wire relative to the thermoplastic resin, so that there may be a case where a required pull-out strength can not be ensured, or likewise.

The present invention has been made to solve the problem as described above, and an object thereof is, in the escalator handrail using the metallic steel wire configured with the center elemental wire and the plurality of strands, to enhance the pull-out strength of the metallic steel wire relative to the thermoplastic resin, and to make the pull-out strength stable.

Means for Solving the Problems

A method of manufacturing an escalator handrail of the invention is characterized by including: a metallic steel wire producing step of placing a center elemental wire and a plurality of strands so that the plurality of strands surrounds the center elemental wire; and applying tension to them in an extending direction of the center elemental wire and the strands so that each distance between the center elemental wire and each of the strands becomes the same, to thereby produce the metallic steel wire; a preheating step of heating the metallic steel wire to a temperature equal to or more than that of a thermoplastic resin in a molten state; a composite-material forming step of integrating the metallic steel wire heated in the preheating step with the thermoplastic resin in a molten state, and extruding them through a die finished into a cross-section shape of the escalator handrail to thereby form the composite material; and a cooling step of forcibly cooling the composite material formed in the composite-material forming step.

Effect of the Invention

According to the method of manufacturing an escalator handrail of the invention, since applying tension to them in the extending direction of the center elemental wire and the strands so that each distance between the center elemental wire and each of the strands becomes the same, to thereby produce the metallic steel wire, and integrating the metallic steel wire with the thermoplastic resin in a molten state, and extruding them through a die finished into a cross-section shape of the escalator handrail to thereby form the composite material, it is possible to enhance the pull-out strength of the metallic steel wire relative to the thermoplastic resin in the escalator handrail, and to make the pull-out strength stable.

MODES FOR CARRYING OUT THE INVENTION

Embodiment 1

Figure 1:
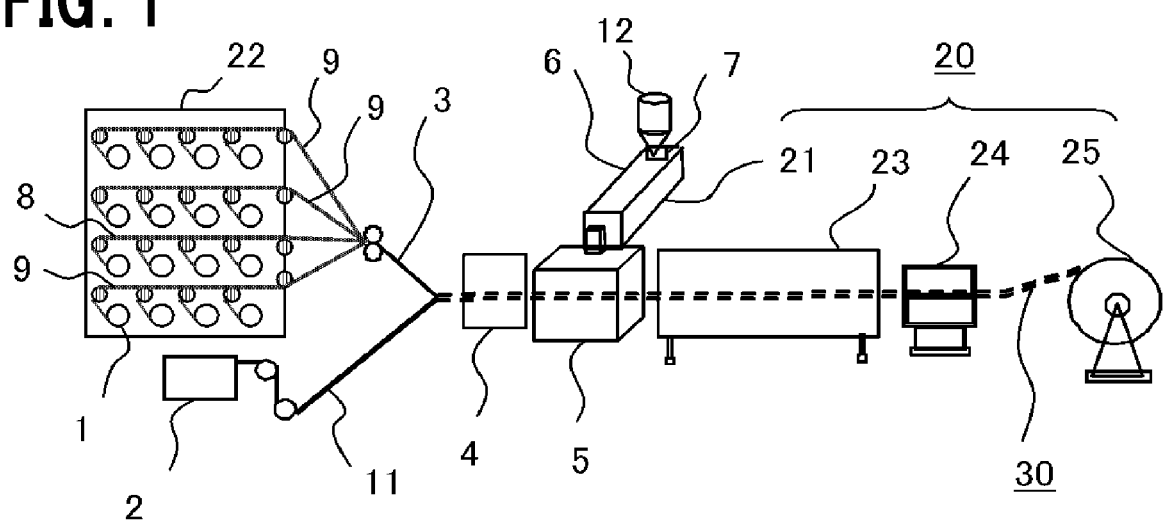
FIG. 1 is a diagram showing a profile extrusion molding apparatus according to Embodiment 1 of the invention.
Figure 2:
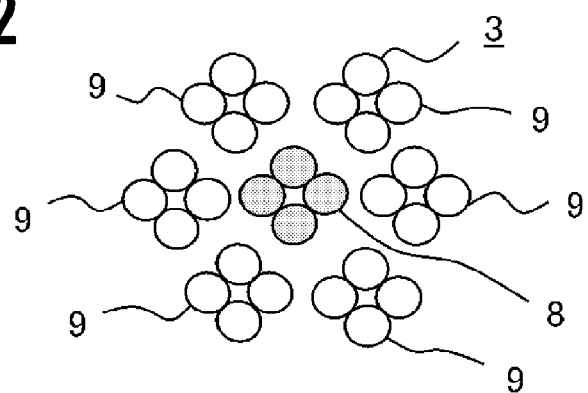
FIG. 2 is a cross-sectional view of a metallic steel wire according to Embodiment 1 of the invention.
Figure 3:
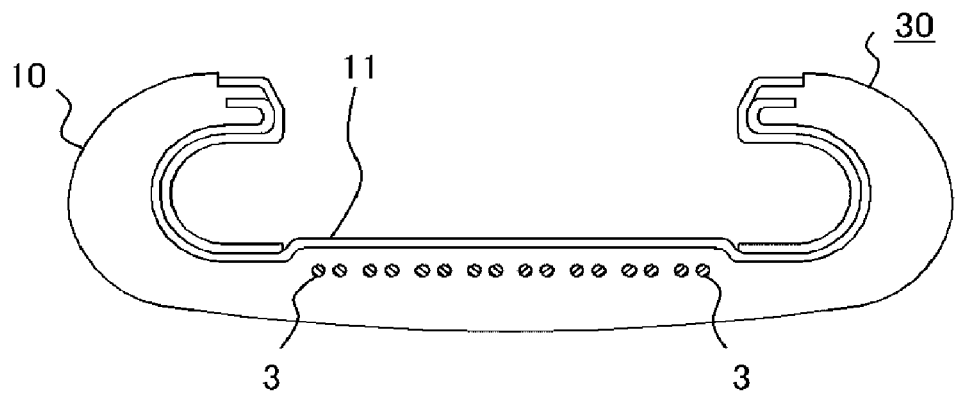
FIG. 3 is a cross-sectional view of an escalator handrail according to Embodiment 1 of the invention.
Figure 4:
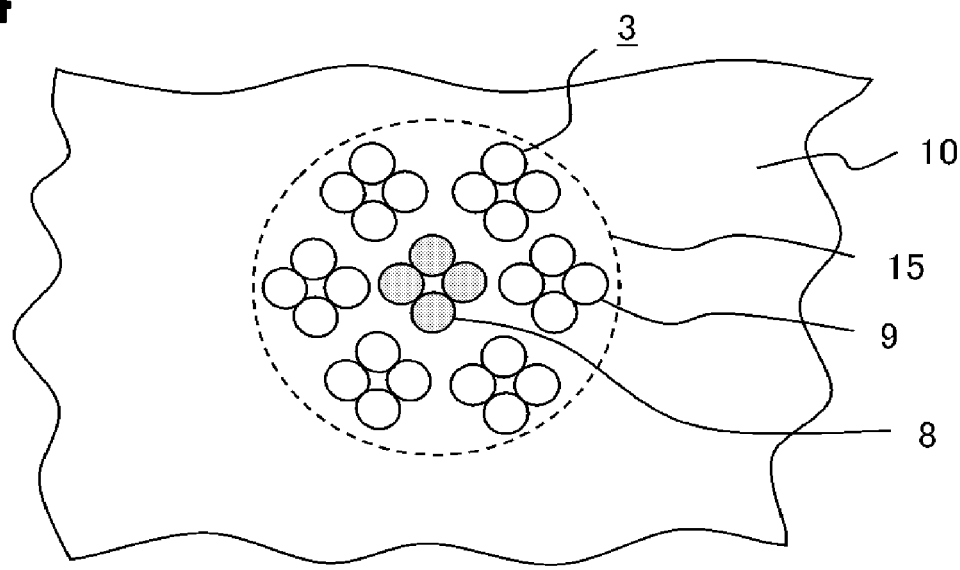
FIG. 4 is an enlarged view around the metallic steel wire in FIG. 3.

FIG. 1 is a diagram showing a profile extrusion molding apparatus according to Embodiment 1 of the invention, and FIG. 2 is a cross-sectional view of a metallic steel wire according to Embodiment 1 of the invention. FIG. 3 is a cross-sectional view of an escalator handrail according to Embodiment 1 of the invention, and FIG. 4 is an enlarged view around the metallic steel wire in FIG. 3. A profile extrusion molding apparatus 20 includes: an extrusion molding unit 21 to perform extrusion molding in order to shape into an escalator handrail 30; a cooling unit 23 to cool an extrusion molded intermediate; a drawer driving unit 24 to draw the extrusion molded intermediate after passing through the cooling unit 23 and getting hardened; and a storage unit 25 to store the escalator handrail 30. As shown in FIG. 3, the escalator handrail 30 comprises a thermoplastic resin 10, a canvas 11 and a metallic steel wire 3.

The escalator handrail 30 comprises a composite material including the metallic steel wire 3, the thermoplastic resin 10 and the canvas 11, and is a profile shape product comprising the composite material in which the metallic steel wire 3 is placed inside the thermoplastic resin 10. With respect to an elongated-shape object that is always associated with its bending and deformation, like the escalator handrail 30, it is required in view of its use, to have flexibility and strong pull-out strength of the metallic steel wire 3. For this reason, as the escalator handrail 30, a profile extrusion molded product comprising a main-construction material and a sub-construction material is used. The main-construction material of the escalator handrail 30 is the thermoplastic resin 10 and the sub-construction material thereof is the metallic steel wire 3. The escalator handrail 30 that is associated with its bending or deforming motion is allowed to run straight when an external force applied to the thermoplastic resin 10 as the main-construction material is surely transferred to the metallic steel wire 3 as the sub-construction material placed inside. In this respect, in order that the metallic steel wire 3 as the sub-construction material may serve as a main strength member, the metallic steel wire 3 placed inside the thermoplastic resin 10 has to ensure sufficient adhesive strength to the resin material around the metallic steel wire 3. This adhesive strength can be defined as a pull-out strength of the metallic steel wire 3 relative to the thermoplastic resin 10, in consideration of the function of the escalator handrail 30.

As shown in FIG. 2, the metallic steel wire 3 includes a center elemental wire 8 and a plurality of strands 9. The plurality of strands 9 is placed so as to surround the center elemental wire 8. The distance between the center elemental wire 8 and each of the strands 9 means a distance between the center of the center elemental wire 8 and the center of the strand 9, and that distance is the same at every position in an extending direction of the center elemental wire 8 and the strands 9. Note that the meaning of "the same" for the distance includes "approximately the same (nearly the same)". The "approximately the same" means that the distance falls within an acceptable range in consideration of a tolerance due to winding tightness or looseness at the time of forming the metallic steel wire 3. In the center elemental wire 8 and the strands 9, tension is kept in the extending direction of the center elemental wire 8 and the strands 9. The tension in the center elemental wire 8 and the strands 9 will be described later. As shown in FIG. 4, the thermoplastic resin 10 is uniformly filled in between the center elemental wire 8 and the plurality of strands 9 in the metallic steel wire 3 without forming a void. Shown in FIG. 2 and FIG. 4 is an example of the metallic steel wire 3 in which six strands 9 are placed to surround the center elemental wire 8 that is single. Note that in FIG. 3, the center elemental wire 8 and the plurality of strands 9 are omitted from illustration, and a region of a broken circle 15 illustrated in FIG. 4 is shown as the metallic steel wire 3.

Such a state where the thermoplastic resin 10 is uniformly filled in between the center elemental wire 8 and the plurality of strands 9 in the metallic steel wire 3 as described above, is a preferable state. However, in the conventional art, when a metallic steel wire comprises a strand wire in which a center elemental wire and a plurality of strands 9 are twisted together, as is different from the present invention, a resin is not uniformly filled around the center elemental wire, resulting in unstable adhesive strength. Accordingly, description will be made in detail about a technology for solving conventional instability in the pull-out strength of the metallic steel wire 3 relative to the thermoplastic resin 10, namely, a technology for enhancing the pull-out strength of the metallic steel wire 3 relative to the thermoplastic resin 10 and making the pull-out strength stable.

Main units of the profile extrusion molding apparatus 20 will be described. The extrusion molding unit 21 of the profile extrusion molding apparatus 20 is configured with: an extrusion molding machine 6 (thermoplastic resin injector) to inject the thermoplastic resin 10 as one part of the composite material; a canvas feeding reel 2 to feed the canvas 11 as another part of the composite material; a metallic steel-wire feeding device 22 to feed the metallic steel wire 3 as still another part of the composite material; a preheat device 4 to heat these three molding materials; and a die 5, that is a mold to mold, for collectively taking the three molding materials in a heated state followed by forming them into a predetermined shape.

The metallic steel-wire feeding device 22 executes a producing step of the metallic steel wire 3 (metallic steel-wire producing step). The metallic steel-wire feeding device 22 is a device to produce the metallic steel-wire 3 and feed it to the preheat device 4, and is provided with a plurality of reels 1 on which metallic wiring members as the materials for the center elemental wire 8 and the strands 9 are wound. As shown in FIG. 2, the center elemental wire 8 and the strands 9 are each provided by twisting four metallic wiring members together. The metallic steel-wire feeding device 22 uses four reels among the reels 1 in order to produce a single center elemental wire 8 or a single strand 9. In order to produce the metallic steel wire 3 including the single center elemental wire 8 and the six strands 9 as shown in FIG. 2, it is required seven reel sets each comprising the four reels 1. In FIG. 1, only four reel sets for producing three strands 9 and the single center elemental wire 8 are shown, and the remaining three reel sets are omitted from illustration.

The metallic steel-wire feeding device 22 performs control of the tensile force for the metallic steel wire 3 to such an extent that gaps are established between the center elemental wire 8 and the strands 9. Performing such control makes it possible to form gaps between the center elemental wire 8 and the strands 9 that can be filled with the thermoplastic resin 10 in a molten state, so that the thermoplastic resin 10 can be fully filled in between the center elemental wire 8 and the strands 9.

The above control of the tensile force will be described in detail. At the time of manufacturing an escalator handrail 30, tensile force control for a metallic steel wire 3 has always been performed by a metallic steel-wire feeding device 22. When the tensile force for the metallic steel wire 3 is large at the time of extrusion-molding the metallic steel wire 3 and the thermoplastic resin 10 to thereby produce a composite material, the metallic steel wire 3 is stretched so that the gap between the center elemental wire 8 and the strand 9 is reduced or the gap is eliminated, and thus, the thermoplastic resin 10 in a molten state is not fully filled around the center elemental wire 8 and the strand 9. When the thermoplastic resin 10 is not fully filled around the center elemental wire 8 and the strand 9, the pull-out strength of the metallic steel wire 3 relative to the thermoplastic resin 10 is lowered, resulting in unstable composite material.

In order to avoid the above problem, the metallic steel-wire feeding device 22 performs control of the tensile force for the metallic steel wire 3 so that sufficient gaps are established between the center elemental wire 8 and the strands 9. By controlling the tensile force, as described previously, the metallic steel-wire feeding device 22 can form the gaps between the center elemental wire 8 and the strands 9 in the metallic steel wire 3 that can be filled with the thermoplastic resin 10 in a molten state, so that the thermoplastic resin 10 can be fully filled in between the center elemental wire 8 and the strands 9.

After the metallic steel wire 3 is produced using the metallic steel-wire feeding device 22, the preheat device 4 executes a step of preheating the metallic steel wire 3 (preheating step) just before subjected to integral molding with the thermoplastic resin 10. The preheat device 4 is a device that heats the metallic steel wire 3 and the canvas 11. With this device, the metallic steel wire 3 can be inserted into the die 5 at a temperature equivalent to or more than (temperature equal to or more than) the temperature of the thermoplastic resin 10 extruded from the extrusion molding machine 6. Because the metallic steel wire 3 is maintained at a temperature equivalent to or more than the temperature of the thermoplastic resin 10, it is prevented that heat in the thermoplastic resin 10 is taken by the metallic steel wire 3 so that the thermoplastic resin 10 is lowered in temperature to get solidified, even at the time the metallic steel wire 3 is in contact with the thermoplastic resin 10 in the die 5. When the metallic steel wire 3 is maintained at a temperature equivalent to or more than the temperature of the thermoplastic resin 10, even in the die 5, the thermoplastic resin 10 can keep a uniform viscosity and fluidity equivalent to that at the time it is extruded from the extrusion molding machine 6.

The extrusion molding machine 6 executes a step of feeding the thermoplastic resin 10 (resin feeding step) to the die 5. The extrusion molding machine 6 shown in FIG. 1 performs control of an injection pressure of the thermoplastic resin 10 for extruding the thermoplastic resin 10. The extrusion molding machine 6 is provided with a thermoplastic-resin pellet inserter 12 to insert a thermoplastic-resin pellet in a thermoplastic-resin pellet insertion port 7, and a controller (unshown) to perform control of the injection pressure of the thermoplastic resin 10. Because the extrusion molding machine 6 performs control of the injection pressure of the thermoplastic resin 10, the placement configuration of the center elemental wire 8 and the strands 9 in the metallic steel wire 3 is mostly unchanged, so that the thermoplastic resin 10 can be fully filled in the gaps in the metallic steel wire 3. The injection pressure of the thermoplastic resin 10 is controlled so that the distances between the center elemental wire 8 and the strands 9 are kept within an allowable range, and a void due to loss of the thermoplastic resin 10 is not formed between the center elemental wire 8 and the strands 9. Note that in FIG. 2 and FIG. 4, an interspace is illustrated among four metallic wiring members in each of the center elemental wire 8 and the strands 9; however, the four metallic wiring members are twisted together, so that the thermoplastic resin 10 is not filled in the interspace among the four metallic wiring members.

The above control of the injection pressure will be described in detail. When the injection pressure of the thermoplastic resin 10 is high, the placement configuration of the center elemental wire 8 and the strands 9 in the metallic steel wire 3 may be changed, and in some cases, the gap between the center elemental wire 8 and the strand 9 is eliminated. When the gap between the center elemental wire 8 and the strand 9 is reduced or the gap is eliminated, the thermoplastic resin 10 in a molten state is not fully filled around the center elemental wire 8 and the strand 9. When the thermoplastic resin 10 is not fully filled around the center elemental wire 8 and the strand 9, the pull-out strength of the metallic steel wire 3 relative to the thermoplastic resin 10 is lowered, resulting in unstable composite material.

Meanwhile, the injection pressure of the thermoplastic resin 10 is low, a void due to loss of the thermoplastic resin 10 may occur between the center elemental wire 8 and the strands 9 in the metallic steel wire 3, so that the thermoplastic resin 10 in a molten state is not fully filled around the center elemental wire 8 and the strand 9. Like the case where the injection pressure of the thermoplastic resin 10 is high, this lowers the pull-out strength of the metallic steel wire 3 relative to the thermoplastic resin 10, resulting in unstable composite material.

In order to avoid the above problem, the extrusion molding machine 6 performs control of the injection pressure of the thermoplastic resin 10. Because the extrusion molding machine 6 performs control of the injection pressure of the thermoplastic resin 10 so that
the distances between the center elemental wire 8 and the strands 9 are kept within an allowable range and the void due to loss of the thermoplastic resin 10 is not formed between the center elemental wire 8 and the strands 9, the placement configuration of the center elemental wire 8 and the strands 9 in the metallic steel wire 3 is mostly unchanged, so that the thermoplastic resin 10 can be fully filled in the gaps in the metallic steel wire 3.

Meanwhile, the thermoplastic-resin pellet insertion port 7 and the inside of the extrusion molding machine 6 are set to a temperature at which the thermoplastic resin 10 is molten. If the thermoplastic resin 10 does not reach its melting temperature, the thermoplastic resin 10 is not molten, so that the thermoplastic resin 10 is not filled in the metallic steel wire 3.

For this reason, in the extrusion molding machine 6 according to the present invention, a temperature control is performed by setting a temperature that is equal to or more than the melting temperature of the thermoplastic resin 10, but less than the decomposition temperature of the thermoplastic resin 10. By thus performing the temperature control, water included in the thermoplastic resin 10 can be evaporated off because the melting temperature of the thermoplastic resin 10 is higher than the boiling point of water. Accordingly, in the extrusion molding machine 6 being set equal to or more than the melting temperature of the thermoplastic resin 10, the moisture contained in the thermoplastic resin 10 is evaporated off, and thus the escalator handrail 30 can be manufactured with a low moisture-content rate. When the moisture-content rate is controlled to be low in the extrusion molding machine 6, the escalator handrail 30 becomes able to mitigate its degradation due to the moisture internally contained in the escalator handrail 30.

The die 5 combines the metallic steel wire 3, the thermoplastic resin 10 and the canvas 11 to thereby execute a step of forming the composite material (composite-material forming step). In the die 5, its cross-section shape through which the composite material is extruded, has been finished into the cross-section shape of the escalator handrail 30. For the die 5 shown in FIG. 1, its internal temperature is controlled to a temperature at which the thermoplastic resin 10 is molten. When the temperature in the die 5 is controlled to be equal to the temperature at which the thermoplastic resin 10 is molten, the die 5 can keep unchanged the temperatures of the metallic steel wire 3 preheated by the preheat device 4 and the thermoplastic resin 10 fed from the extrusion molding machine 6, so that the thermoplastic resin 10 can be filled in between the center elemental wire 8 and the strands 9 in the metallic steel wire 3 without occurrence of a void due to loss of the thermoplastic resin 10. Because a void due to loss of the thermoplastic resin 10 does not occur between the center elemental wire 8 and the strands 9 in the metallic steel wire 3, the composite material produced from the die 5 is well-suited to the escalator handrail 30 configured with the metallic steel wire 3, the thermoplastic resin 10 and the canvas 11. Because a void due to loss of the thermoplastic resin 10 does not occur between the center elemental wire 8 and the strands 9 in the metallic steel wire 3, the escalator handrail using the composite material produced from the die 5 is enhanced in the pull-out strength of the metallic steel wire 3 relative to the thermoplastic resin 10, and is made stable in the pull-out strength.

The above temperature control of the die 5 will be described in detail. When the temperature of the die 5 is not set to the melting temperature of the thermoplastic resin 10, the temperature of the thermoplastic resin 10 ejected from the extrusion molding machine 6 is lowered so that the thermoplastic resin 10 gets solidified; further, the metallic steel wire 3 having been preheated and coming out of the preheat device 4 is also cooled, making the viscosity and fluidity of the thermoplastic resin 10 lower. When the viscosity and fluidity of the thermoplastic resin 10 is lowered, a void due to loss of the thermoplastic resin 10 occurs between the center elemental wire 8 and the strands 9 in the metallic steel wire 3, so that the thermoplastic resin 10 is not fully filled in the metallic steel wire 3.

In order to avoid the above problem, the die 5 is controlled to be at a temperature at which the thermoplastic resin 10 is molten. The die 5, when its internal temperature is controlled to the temperature at which the thermoplastic resin 10 is molten, can keep unchanged the temperatures of the metallic steel wire 3 and the thermoplastic resin 10, so that the thermoplastic resin 10 can be filled in between the center elemental wire 8 and the strands 9 in the metallic steel wire 3 without occurrence of a void due to loss of the thermoplastic resin 10. Because a void due to loss of the thermoplastic resin 10 does not occur between the center elemental wire 8 and the strands 9 in the metallic steel wire 3, the composite material produced from the die 5 is well-suited to the escalator handrail 30 configured with the metallic steel wire 3, the thermoplastic resin 10 and the canvas 11. Because a void due to loss of the thermoplastic resin 10 does not occur between the center elemental wire 8 and the strands 9 in the metallic steel wire 3, the escalator handrail 30 manufactured by the profile extrusion molding apparatus 20 is enhanced in the pull-out strength of the metallic steel wire 3 relative to the thermoplastic resin 10, and is made stable in the pull-out strength.

Description will be made about the steps of forming the escalator handrail 30 by use of the above profile extrusion molding apparatus 20.

The metallic steel-wire feeding device 22 produces the metallic steel wire 3 and sends out the metallic steel wire 3 toward the downstream side (metallic steel-wire producing step). The metallic steel wire 3 produced by the metallic steel-wire feeding device 22 and the canvas 11 coming out of the canvas feeding reel 2 are heated in the preheat device 4 to a temperature equivalent to or more than the melting temperature of the thermoplastic resin 10 so that, in the die 5, they become at a temperature that is the same as the melting temperature of the thermoplastic resin 10 (preheating step). The thermoplastic resin 10 whose temperature and injection pressure are being controlled is fed from the extrusion molding machine 6 to the die 5 (resin feeding step), so that, in the die 5, the metallic steel wire 3 and the canvas 11 in the heated state are joined with the thermoplastic resin 10 in a molten state, at the temperature same as that of the thermoplastic resin. After the metallic steel wire 3, the canvas 11 and the thermoplastic resin 10 are joined together, from the inside of the die 5, the composite material in which the metallic steel wire 3, the thermoplastic resin 10 and the canvas 11 are integrated together, is extruded into the shape of the escalator handrail 30 (composite-material forming step), which is then forcibly subjected to cooling (forced cooling) byway of cooling water in the cooling unit 23 in order to maintain its shape (cooling step). After cooling, the escalator handrail 30 provided as the composite material in a hardened state is drawn out by the drawer driving unit 24, and then the escalator handrail 30 is stored in the storage unit 25 (storing step).

The preheat device 4 and the die 5 shown in FIG. 1 are arranged so that the temperature during transportation from the preheat device 4 to the die 5, is not lowered to less than the melting temperature of the thermoplastic resin 10. Note that, in the case where the preheat device 4 is arranged close to the die 5 so that the temperature of the metallic steel wire 3 and the canvas 11 in a heated state does not lowered during transportation from the preheat device 4 to the die 5, the temperature for heating the metallic steel wire 3 and the canvas 11 by the preheat device 4 may be set to a temperature equal to the melting temperature of the thermoplastic resin 10.

Because the preheat device 4 and the die 5 under temperature control are provided, the metallic steel wire 3 of Embodiment 1 can be delivered from the preheat device 4 to the die 5 without lowering its temperature, and the temperature of the metallic steel wire 3 can be maintained to a temperature equivalent to or more than the temperature of the thermoplastic resin 10 (within a temperature range where a temperature is equal to or more than the melting temperature of the thermoplastic resin but less than its decomposition temperature).

Because the temperature of the metallic steel wire 3 is maintained to a temperature equivalent to or more than the temperature of the thermoplastic resin 10 (within a temperature range where a temperature is equal to or more than the melting temperature of the thermoplastic resin but less than its decomposition temperature), even at the time the thermoplastic resin 10 of Embodiment 1 is in contact with the metallic steel wire 3 in the die 5, there is no case where its heat is taken by the metallic steel wire 3 so that the thermoplastic resin 10 is lowered in temperature to get solidified; thus, the thermoplastic resin 10 can keep a uniform viscosity and fluidity equivalent to that at the time it is extruded from the extrusion molding machine 6.

Thus, according to the escalator handrail 30 of Embodiment 1, because the temperature of the metallic steel wire 3 and the temperature of the thermoplastic resin 10 are made the same in the process of the profile extrusion molding using the composite material, the thermoplastic resin 10 can be uniformly and fully filled in between the center elemental wire 8 and the strands 9 in the metallic steel wire 3 without causing solidification of the thermoplastic resin 10 in the die 5, so that it is possible to enhance the pull-out strength of the metallic steel wire 3 relative to the thermoplastic resin 10. Note that the meaning of "the same" for the temperature includes "approximately the same (nearly the same)". The "approximately the same" means that the temperature falls within an acceptable range in consideration of a tolerance. According to the escalator handrail 30 of Embodiment 1, because the pull-out strength of the metallic steel wire 3 relative to the thermoplastic resin 10 is enhanced, it is possible to make the pull-out strength stable for a long period of time.

The profile extrusion molding apparatus 20 in Embodiment 1 performs control of the injection pressure and temperature of the thermoplastic resin 10 in the process of the profile extrusion molding using the composite material, so that when the thermoplastic resin 10 is extruded into the die 5, the thermoplastic resin 10 can be uniformly and fully filled in the metallic steel wire 3 without occurrence of a void due to loss of the thermoplastic resin 10 between the center elemental wire 8 and the strands 9 in the metallic steel wire 3. The profile extrusion molding apparatus 20 in Embodiment 1 can manufacture the escalator handrail 30 which is enhanced in the pull-out strength of the metallic steel wire 3 relative to the thermoplastic resin 10 and is made stable in the strength as the composite material, namely, the escalator handrail 30 with an enhanced quality.

As described above, according to the escalator handrail 30 of Embodiment 1, it is characterized in that: the metallic steel wire 3 comprises the center elemental wire 8 and the plurality of strands 9 placed so as to surround the center elemental wire 8; the distance between the center elemental wire 8 and each of the strands 9 is the same at every position in the extending direction of the center elemental wire 8 and the strands 9; and the thermoplastic resin 10 is filled in between the center elemental wire 8 and the strands 9 without forming a void. Thus, it is possible to enhance the pull-out strength of the metallic steel wire 3 relative to the thermoplastic resin 10 in the escalator handrail 30, and to make the pull-out strength stable.

According to the method of manufacturing an escalator handrail of Embodiment 1, it is characterized by including: the metallic steel-wire producing step of placing the center elemental wire 8 and the plurality of strands 9 so that the plurality of strands surrounds the center elemental wire 8, and applying tension to them in the extending direction of the center elemental wire 8 and the strands 9 so that each distance between the center elemental wire 8 and each of the strands 9 becomes the same, to thereby produce the metallic steel wire 3; the preheating step of heating the metallic steel wire 3 to a temperature equal to or more than that of the thermoplastic resin 10 in a molten state; the composite-material forming step of integrating the metallic steel wire 3 heated in the preheating step with the thermoplastic resin 10 in a molten state, and extruding them through the die 5 finished into the cross-section shape of the escalator handrail 30 to thereby form the composite material; and the cooling step of forcibly cooling the composite material formed in the composite-material forming step. Thus, it is possible to manufacture the escalator handrail 30 which is enhanced in the pull-out strength of the metallic steel wire 3 relative to the thermoplastic resin 10 and is made stable in the pull-out strength, namely, the escalator handrail 30 with an enhanced quality.

Embodiment 2

Figure 5:
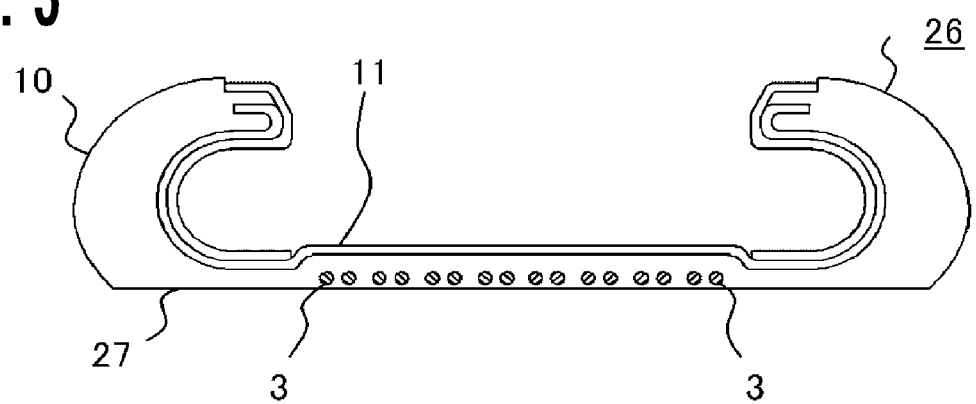
FIG. 5 is a cross-sectional view of a handrail intermediate according to Embodiment 2 of the invention.
Figure 6:
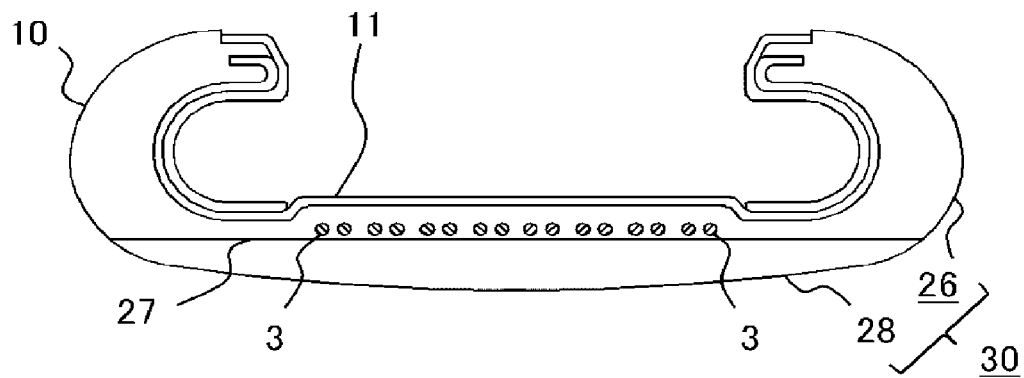
FIG. 6 is a cross-sectional view of an escalator handrail according to Embodiment 2 of the invention.

FIG. 5 is a cross-sectional view of a handrail intermediate according to Embodiment 2 of the invention, and FIG. 6 is a cross-sectional view of an escalator handrail according to Embodiment 2 of the invention. An escalator handrail 30 of Embodiment 2 is a product by a multi-layer molding. For the escalator handrail 30 of Embodiment 2, firstly, the metallic steel wire 3, the thermoplastic resin 10 and the canvas 11 are integrally molded in the die 5 and then cooled, to accomplish a first-layer molding. The product after completion of the first-layer molding is a handrail intermediate 26. After performing the first-layer molding, in order to get rigidity, a thermoplastic resin 28 that is the same material as the thermoplastic resin 10, is thick coated over an exposed portion 27 of the thermoplastic resin 10 that is on an opposite side to the canvas 11 in the handrail intermediate 26, to thereby accomplish the multi-layer molding. As shown in FIG. 6, the escalator handrail 30 of Embodiment 2 comprises the handrail intermediate 26 and the thermoplastic resin 28.

At the time of performing the first-layer molding, the thermoplastic resin 10 is set to have a predetermined thickness to the extent that it covers the metallic steel wire 3. Specifically, a first thermoplastic resin (thermoplastic resin 10) covering the metallic steel wire 3 in the handrail intermediate 26 has a thickness from its inner face that will be facing to the escalator to which the escalator handrail 30 is to be fitted (on the side where the canvas 11 is attached), to the outer face of the exposed portion 27 that is on an opposite side to the inner face, which is the above predetermined thickness and is, for example, within twice a height of the metallic steel wire 3 in a thickness direction of the first thermoplastic resin (thermoplastic resin 10). The smaller the volume of the thermoplastic resin 10, the faster the cooling speed of the handrail intermediate 26 after coming out of the die 5, and the metallic steel wire 3 is immobilized by the thermoplastic resin 10 in a hardened state. Accordingly, the thermoplastic resin 10 filled in the metallic steel wire 3 becomes tighter, so that the pull-out strength is enhanced. According to the escalator handrail 30 of Embodiment 2, like Embodiment 1, it becomes possible to place the center elemental wire 8 and each of the strands 9 not to be in contact with each other, and also to place the plurality of strands 9 not to be in contact with each other.

Embodiment 3

The thermoplastic resin 10 is injected through the extrusion molding machine 6 into the die 5. In Embodiment 3, description will be made about an escalator handrail 30 in which, because of making optimization of the internal temperature of the extrusion molding machine 6, the thermoplastic resin filled in the metallic steel wire 3 is tighter and thus the pull-out strength is higher than those in Embodiment 1 and Embodiment 2.

Figure 7:
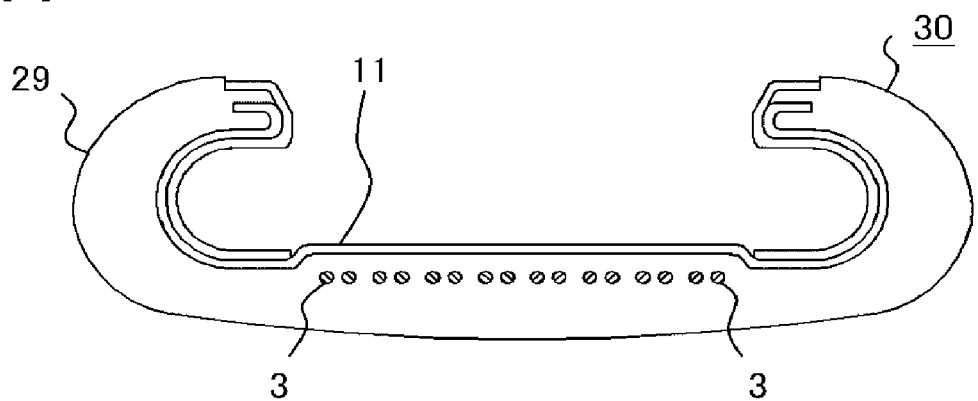
FIG. 7 is a cross-sectional view of an escalator handrail according to Embodiment 3 of the invention.
Figure 8:
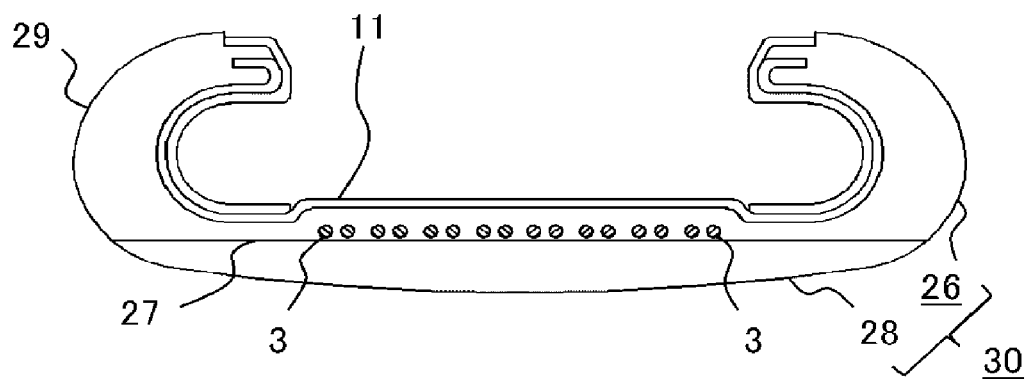
FIG. 8 is a cross-sectional view of another escalator handrail according to Embodiment 3 of the invention.

FIG. 7 is a cross-sectional view of an escalator handrail according to Embodiment 3 of the invention, and FIG. 8 is a cross-sectional view of another escalator handrail according to Embodiment 3 of the invention. In Embodiment 3, the extrusion molding machine 6 is heated so that its internal temperature reaches an upper-limit temperature at which decomposition of a thermoplastic resin 29 that is the same material as the thermoplastic 10 is not initiated. The thermoplastic resin 29 has a property such that its viscosity is lowered as the temperature becomes higher, so that when the inside of the extrusion molding machine 6 is set to a higher temperature, the viscosity of the thermoplastic resin 29 passing through the extrusion molding machine 6 is lowered. When the inside of the extrusion molding machine 6 is set to a higher temperature so as to use the thermoplastic resin 29 whose viscosity is lowered to a minimum value without undergoing decomposition, the thermoplastic resin 29 becomes well-penetrated into the metallic steel wire 3 in the die 5, so that the thermoplastic resin 29 is fully filled around the center elemental wire 8 and the strand 9, and thus the pull-out strength of the metallic steel wire 3 relative to the thermoplastic resin 29 is enhanced.

According to the escalator handrail 30 of Embodiment 3, the thermoplastic resin 29 whose viscosity is lowered to a minimum value without undergoing decomposition has been used, so that the thermoplastic resin 29 filled in the metallic steel wire 3 becomes tighter and thus the pull-out strength becomes higher than those in Embodiment 1 and Embodiment 2.

It should be noted that unlimited combination of the respective embodiments and an appropriate modification/omission in the embodiments may be made in the present invention without departing from the scope of the invention.

DESCRIPTION OF REFERENCE NUMERALS and SIGNS

3: metallic steel wire, 5: die, 8: center elemental wire, 9: strand, 10: thermoplastic resin, 27: exposed portion, 28: thermoplastic resin, 29: thermoplastic resin, 30: escalator handrail.

What is claimed is:

1. A method of manufacturing an escalator handrail which comprises a composite material including a metallic steel wire, a canvas and a thermoplastic resin, said metallic steel wire having a center elemental wire and a plurality of strands placed so as to surround the center elemental wire, comprising:
   a preheating step of heating the metallic steel wire and the canvas together in a preheater;
   a composite-material forming step of integrating the metallic steel wire and the canvas heated together in the preheating step with the thermoplastic resin in a molten state to thereby form the composite material; and
   a cooling step of cooling the composite material formed in the composite-material forming step.

2. The method of manufacturing an escalator handrail of claim 1, wherein, in the preheating step, the metallic steel wire is heated to a temperature equivalent to or more than a melting temperature of the thermoplastic resin.

3. The method of manufacturing an escalator handrail of claim 1, wherein, in the preheating step, the metallic steel wire is heated to a temperature equal to or more than that of the thermoplastic resin in the molten state.

4. The method of manufacturing an escalator handrail of claim 1, wherein, in the composite-material forming step, the metallic steel wire and the thermoplastic resin are extruded through a die to form the composite material.

5. The method of manufacturing an escalator handrail of claim 1, wherein the metallic steel wire is a strand wire in which the center elemental wire and the plurality of strands are twisted together.

6. The method of manufacturing an escalator handrail of claim 1, wherein, in the composite-material forming step, the metallic steel wire and the thermoplastic resin are extruded through a die to form the composite material; an internal temperature of the die is controlled to be the same as a temperature at which the thermoplastic resin is molten; and an injection pressure of the thermoplastic resin in the molten state injected into the die is controlled so that a distance between the center elemental wire and each of the strands is kept within an allowable range.

7. The method of manufacturing an escalator handrail of claim 1, wherein the thermoplastic resin to be fed at the time of the composite-material forming step is heated so as to have a viscosity lowered to a minimum value without undergoing decomposition.

* * * * *